(12) United States Patent
Kim et al.

(10) Patent No.: US 10,116,755 B2
(45) Date of Patent: Oct. 30, 2018

(54) APPARATUS AND METHOD FOR PROVIDING SOCIAL NETWORK SERVICE (71) Applicant: NAVER CORPORATION, Seongnam-si (KR)

(72) Inventors: Kwang Hyun Kim, Seongnam-si (KR); Chang Bong Kim, Seongnam-si (KR); Jae Ho Choi, Seongnam-si (KR); Woong Seon Yoo, Seongnam-si (KR); Keun Chan Park, Seongnam-si (KR); Ki Hyuk Hong, Seongnam-si (KR); Woo Hyun Jin, Seongnam-si (KR); Dong Hyun Joo, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 241 days.

(21) Appl. No.: 14/984,772

(22) Filed: Dec. 30, 2015

(65) Prior Publication Data
US 2016/0198009 A1    Jul. 7, 2016

(30) Foreign Application Priority Data
Jan. 2, 2015 (KR) .................. 10-2015-0000291

(51) Int. Cl.
*G06F 15/16* (2006.01)
*H04L 29/08* (2006.01)
(Continued)

(52) U.S. Cl.
CPC ......... *H04L 67/20* (2013.01); *G06Q 30/0631* (2013.01); *G06Q 50/01* (2013.01)

(58) Field of Classification Search
CPC ........................ H04L 67/20; G06Q 30/0631
(Continued)

(56) References Cited

U.S. PATENT DOCUMENTS

| | | | |
|---|---|---|---|
| 8,887,042 B2 * | 11/2014 | Song | G06Q 30/06 715/202 |
| 8,949,250 B1 * | 2/2015 | Garg | G06F 17/3053 707/748 |

(Continued)

FOREIGN PATENT DOCUMENTS

| | | |
|---|---|---|
| KR | 10-2013-0064436 | 6/2013 |
| KR | 10-2014-0125939 | 10/2014 |

OTHER PUBLICATIONS

Korean Office Action issued in Korean patent application No. 10-2015-0000291, dated Sep. 9, 2015.

*Primary Examiner* — David R Lazaro
*Assistant Examiner* — Mariegeorges A Henry
(74) *Attorney, Agent, or Firm* — Greer, Burns & Crain, Ltd.

(57) ABSTRACT

A method of providing a service includes receiving, from a user terminal, a first request to search for a service provider, a second request to display a newsfeed screen, or a third request to display a home screen; and providing a result corresponding to the received first, second, or third request. When the first request is received, providing of the result corresponding to the received first request includes providing a list of service providers searched for according to the first request such that a service provider recommended by more friends is set to have a higher exposure priority on the list. The friends correspond to other user accounts designated to have a first relation with a first user account which is the user's account.

9 Claims, 10 Drawing Sheets

(51) Int. Cl.
  *G06Q 50/00* (2012.01)
  *G06Q 30/06* (2012.01)
(58) Field of Classification Search
  USPC .................................................. 709/205, 217
  See application file for complete search history.

(56) References Cited

U.S. PATENT DOCUMENTS

| | | | |
|---|---|---|---|
| 2008/0212511 A1* | 9/2008 | Sawada | H04M 1/274583 |
| | | | 370/312 |
| 2013/0066981 A1 | 3/2013 | Park et al. | |
| 2013/0232553 A1* | 9/2013 | Tomfohrde | G06F 21/10 |
| | | | 726/4 |
| 2014/0136527 A1 | 5/2014 | Yoon et al. | |
| 2014/0236935 A1* | 8/2014 | Doebele | G06F 17/30864 |
| | | | 707/723 |
| 2015/0039549 A1* | 2/2015 | Aufmann | G06F 17/3053 |
| | | | 706/46 |
| 2015/0199727 A1* | 7/2015 | Naveh | G06Q 30/0269 |
| | | | 705/14.66 |
| 2015/0207666 A1* | 7/2015 | Basso | G06F 17/30345 |
| | | | 709/223 |

\* cited by examiner

FIG. 10

APPARATUS AND METHOD FOR PROVIDING SOCIAL NETWORK SERVICE

CROSS-REFERENCE TO RELATED APPLICATION

This application claims the benefit of Korean Patent Application No. 10-2015-0000291, filed on Jan. 2, 2015, in the Korean Intellectual Property Office, the disclosure of which is incorporated herein in its entirety by reference.

BACKGROUND

1. Field

One or more exemplary embodiments of the present invention relate to a method and apparatus for providing a social network service.

2. Description of the Related Art

Service providers provide various services. Unlike products manufactured in a factory which are all the same, the qualities of services vary according to the providers who provide the services. Thus, users may consult with their acquaintances or search the Internet to find a service provider who will provide satisfactory services. However, consulting with acquaintances about such service providers is limited in terms of time and place, and the reliability of the result of searching the Internet is not guaranteed due to the spread of indiscriminate advertisements.

SUMMARY

One or more exemplary embodiments of the present invention include a method and apparatus for providing a social network service (SNS). In detail, one or more exemplary embodiments include an SNS providing method and apparatus for enabling a user to easily share information regarding a service provider with other users.

Additional aspects will be set forth in part in the description which follows and, in part, will be apparent from the description, or may be learned by practice of the presented embodiments.

According to one or more exemplary embodiments, a method of providing a service includes receiving, from a user's terminal, a first request to search for a service provider, a second request to display a newsfeed screen, or a third request to display a home screen; and providing a result corresponding to the received first, second, or third request. During the receiving of the first, second, or third request, when the first request is received, the providing of the result corresponding to the received first, second, or third request includes providing a list of service providers searched for according to the first request such that a service provider recommended by more friends is set to have a higher exposure priority in the list. The friends correspond to other user accounts designated to have a first relation with a first user account which is the user's account.

According to one or more exemplary embodiments, an apparatus for providing a service includes an interface providing unit configured to receive, from a user's terminal, a first request to search for a service provider, a second request to display a newsfeed screen, or a third request to display a home screen; and an information processing unit configured to provide a result corresponding to the received first, second, or third request. The information processing unit includes a search unit configured to search for a service provider and provide a list of service providers searched for according to the first request when the first request is received. The search unit sets exposure priorities of the service providers in the list such that an exposure priority of a service provider recommended by more friends is higher. The friends correspond to other user accounts designated to have a first relation with a first user account which is the user's account.

According to one or more exemplary embodiments, there is provided a non-transitory computer-readable recording medium having recorded thereon a program which, when executed by a computer, performs the above method.

BRIEF DESCRIPTION OF THE DRAWINGS

These and/or other aspects of the present invention will become apparent and more readily appreciated from the following description of the embodiments, taken in conjunction with the accompanying drawings in which.

DETAILED DESCRIPTION

Reference will now be made in detail to embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description.

It will be understood that, although the terms 'first', 'second', 'third,' etc., may be used herein to describe various elements, components, regions, layers and/or sections, these elements, components, regions, layers and/or sections should not be limited by these terms. These terms are only used to distinguish one element, component, region, layer or section from another region, layer or section. As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof. For convenience of explanation, the sizes of elements may be exaggerated in the drawings. For example, the sizes of the elements illustrated in the drawings are arbitrarily determined and thus exemplary embodiments are not limited thereby.

As used herein, the term 'and/or' includes any and all combinations of one or more of the associated listed items. Expressions such as 'at least one of,' when preceding a list of elements, modify the entire list of elements and do not modify the individual elements of the list.

Figure 1:
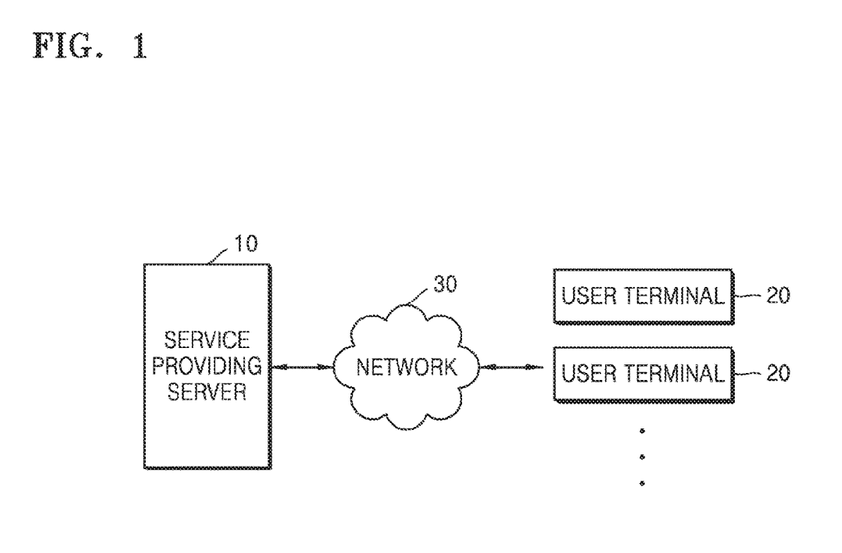
FIG. 1 is a diagram illustrating a service providing system according to an exemplary embodiment.

FIG. 1 is a diagram illustrating a service providing system according to an exemplary embodiment.

Referring to FIG. 1, a service providing system according to an exemplary embodiment includes a service providing server 10, user terminals 20, and a network 30 connecting the service providing server 10 and the user terminals 20 to each other.

According to an exemplary embodiment, a service provides, for example, a social network service available between users. The social network service may be a service provided, focusing on a function of sharing information regarding a service provider (hereinafter referred to as an 'SP'). For example, users may use a service according to an exemplary embodiment to share information regarding an SP with other users, recommend an SP, prepare a review of an SP, and search for an SP. An SP may be an individual, a corporate body, an organization, etc. An SP may be understood as a concept including all subjects that provide a user with a service. For example, an SP may be one of subjects providing various services, e.g., a babysitter, a private tutor, a domestic assistant, a car repair center, a photo studio, a professional photographer, a used-car salesman, a piano instructor, an interior designer, etc.

According to an exemplary embodiment, accounts subscribing to a service may be classified into user accounts and SP accounts. A predetermined relation may be established between user accounts and/or SP accounts. For example, a first relation may be established between user accounts. A second relation may be established between a user account and an SP account. The first relation may be referred to as a friendship. The second relation may be referred to as a bridge relation. The friendship may be a relation between one user account and another user account. The bridge relation may be a relation between one user account and one SP account. For one user account, a plurality of friends and a plurality of bridges may be designated. That is, for one user account, a plurality of other user accounts may be designated as "friends" and a plurality of SP accounts may be designated as "bridges." A user may prepare a review of an SP or recommend an SP.

According to an exemplary embodiment, the service providing server 10 receives a request from a user terminal 20 and provides the user terminal 20 with a result corresponding to the request. For example, the service providing server 10 may receive, from the user terminal 20, a first request to search for an SP, a second request to display a newsfeed screen, or a third request to display a home screen, and provide the user terminal 20 with a result corresponding to the first, second, or third request. When the service providing server 10 receives the first request, the service providing server 10 may provide a list of service providers corresponding to a search condition. When the service providing server 10 receives the second request, the service providing server 10 may provide a newsfeed screen enumerating events generated by users designated as friends or events generated by SPs designated as bridges. When the service providing server 10 receives the third request, the service providing server 10 may provide a home screen displaying information related to a user account to which the user terminal 20 logs in.

According to an exemplary embodiment, the user terminals 20 are communication terminals capable of using a web service in a wire/wireless communication environment. Here, the user terminals 20 may be users' personal computers or portable terminals. However, the inventive concept is not limited thereto and any terminal having a web browsing application may be used as the user terminals 20 without limit. Each of the user terminals 20 includes a display unit configured to display a screen, and an input device configured to receive data from a user. The user terminal 20 may be configured to access the service providing server 10 and to log in to a user account or an SP account. Hereinafter, in a description regarding operations performed by a user, it may be understood that the operations are performed by the corresponding user terminal 20.

According to an exemplary embodiment, the network 30 connects the user terminal 20 and the service providing server 10 to each other. For example, the network 30 provides an access path in which the user terminal 20 may access the service providing server 10 to exchange packet data with the service providing server 10.

Although not shown, each of the service providing server 10 and the user terminals 20 may include a memory, an input/output unit, a program storage unit, a controller, etc.

Figure 2:
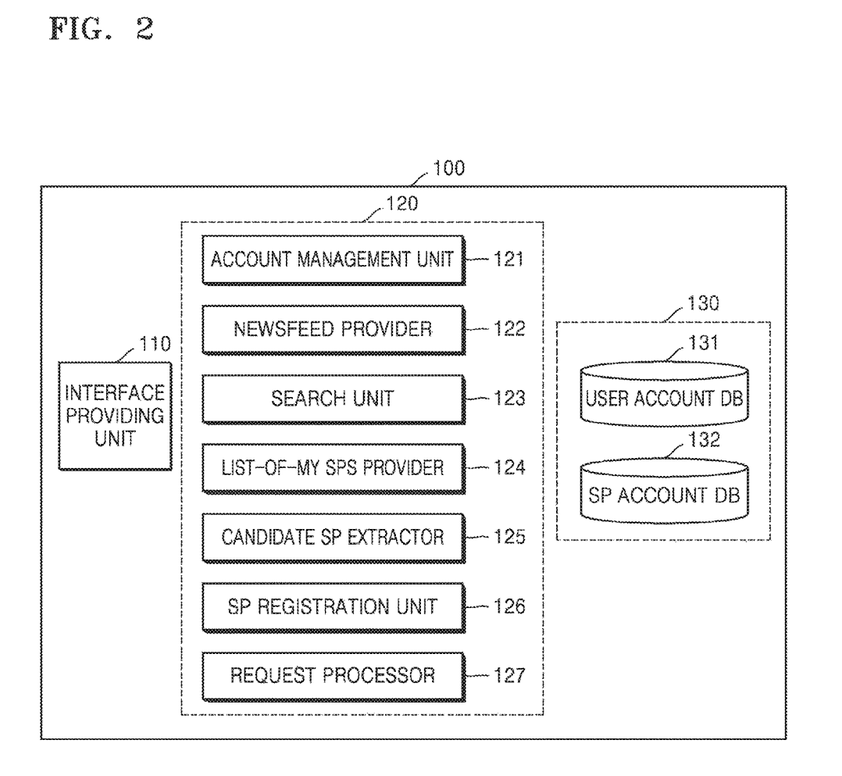
FIG. 2 is a block diagram of a service providing apparatus according to an exemplary embodiment.

FIG. 2 is a block diagram of a service providing apparatus 100 according to an exemplary embodiment.

According to an exemplary embodiment, the service providing apparatus 100 may correspond to or include at least one processor. Thus, the service providing apparatus 100 may be driven in a state in which it is included in a hardware device such as a microprocessor or a general-purpose system, or may be installed in the service providing server 10.

However, exemplary embodiments are not limited thereto, and at least one element of the service providing apparatus 100 may be included in the user terminals 20. For example, a database (DB) 130 of the service providing apparatus 100 may be included in the service providing server 10 and the other elements thereof may be included in the user terminals 20. However, the structure of the service providing apparatus 100 is not limited thereto and may be embodied in many different forms. For example, an interface providing unit 110 of the service providing apparatus 100 may be included in the user terminals 20 and the other elements thereof may be included in the service providing server 10. Alternatively, some elements of the service providing apparatus 100 of FIG. 2 may be included in the user terminals 20 and the other elements thereof may be included in the service providing server 10.

Exemplary embodiments will now be described in detail with respect to a case in which the service providing apparatus 100 according to an exemplary embodiment is installed in the service providing server 10. However, exemplary embodiments are not limited thereto and are also applicable to various modified examples.

FIG. 2 illustrates only elements of the service providing apparatus 100 related to the present embodiment so as to prevent features of the present embodiment from being obscure. It would be apparent to those of ordinary skill in the technical field to which the inventive concept pertains that the service providing apparatus 100 may further include other general elements. The service providing apparatus 100 includes the interface providing unit 110, the information processing unit 120, and the database (hereinafter referred to as a 'DB') 130.

According to an exemplary embodiment, the interface providing unit 110 provides the user terminals 20 with either a screen or an input/output interface via which a user input may be received. The interface providing unit 110 may provide a user with information provided from the information processing unit 120, receive a user input, and provide the user input to the information processing unit 120. The interface providing unit 110 may provide both a physical hardware interface and a logical software interface.

The interface providing unit 110 may receive a first request, a second request, or a third request from a user, and provide the received request to the information processing unit 120 so as to perform a function corresponding to the received request.

According to an exemplary embodiment, the information processing unit 120 handles various requests received from the user terminals 20. Hereinafter, a request to search for an SP will be referred to as a 'first request', a request to display a newsfeed screen will be referred to as a 'second request', and a request to display a home screen will be referred to as a 'third request'. According to an exemplary embodiment, the information processing unit 120 may handle the first request, the second request, and the third request received from the user terminal 20. According to an exemplary embodiment, the information processing unit 120 includes an account management unit 121, a newsfeed provider 122, a search unit 123, a list-of-my SPs provider 124, a candidate SP extractor 125, an SP registration unit 126, and a request processor 127.

According to an exemplary embodiment, the account management unit 121 manages user accounts and SP accounts. For example, when a request to log in to a user account or an SP account is received from a user terminal 20, the account management unit 121 allows the user terminal 20 to log in to the user account or the SP account, based on account information. The account management unit 121 may receive log in information regarding a first user account from the user terminal 20 and allow the user terminal 20 to log in to the first user account.

The account management unit 121 may perform general account-related management, e.g., registration, deletion, etc. of a user account or an SP account, and update the DB 130. The account management unit 121 handles a request to designate a friend and a request to designate a bridge received from a user account, and reflect a result of handing the requests in the DB 130.

According to an exemplary embodiment, when the newsfeed provider 122 receives a second request to provide a newsfeed screen from the user terminal 20, the newsfeed provider 122 provides the newsfeed screen to the user terminal 20. The second request is received via the interface providing unit 110, and the newsfeed screen may be provided via the interface providing unit 110. The newsfeed screen is a screen for enumerating events. The events may be generated through another user account designated as a friend of a user account (hereinafter referred to as a 'friend account') or through an SP account designated as a bridge of the user account (hereinafter referred to as a 'bridge account'). An order in which the events are enumerated may be determined according to a predetermined condition. For example, the events may be enumerated according to times when they were generated.

An event may be generated through a friend account, for example, when an SP is designated as a bridge through the friend account, when designating of an SP as a bridge is canceled through the friend account, a review of an SP is prepared through the friend account, or when an SP is recommended through the friend account. An event may be generated by a bridge account, for example, when information regarding an SP account is changed or when new writing is prepared through the SP account. However, exemplary embodiments are not limited thereto. A user may view events, which are generated through the friend account or the bridge account, via the newsfeed screen displayed on one screen.

According to an exemplary embodiment, when the search unit 123 receives a first request to search for an SP from the user terminal 20, the search unit 124 may search for an SP and provide a result of searching for an SP to the user terminal 20 according to the first request. The first request may be received via the interface providing unit 110. The result of searching for an SP may be provided via the interface providing unit 110. The result of searching for an SP may include a list of SPs searched for according to the first request. In the list of SPs, an exposure priority of an SP recommended by more friends may be set to be higher.

The first request may include a search word for searching for an SP, and location information defining the location of the SP. For example, the first request may include a search word 'babysitter' and location information of 'Seoul'. The search unit 123 may receive the first request as described above, and provide the user terminal 20 with a list of SPs who are babysitters providing a service in Seoul among SPs who have signed up for the service.

The search unit 123 may use various algorithms to match a search word and an SP. For example, when a search word is included in the name of an SP, the type of service, a review registered with respect to the SP, an introduction of the SP input by the SP itself, etc., the SP may be included as a search result.

An order in which SPs are enumerated may be determined according to a predetermined condition. For example, an SP designated more frequently as a bridge through a user's friend accounts may be enumerated earlier. Thus, an SP designated most frequently as a bridge through the user's friend accounts is first exposed. Thus, the user may achieve the same effect as that when the user is recommended the SP from his/her friends. Accordingly, the user may be provided a highly reliable search result.

The search unit 123 may determine exposure priorities of SPs, based on other various criteria. Examples of criteria will be described below. Here, various conditions are enumerated in an order of importance, but exemplary embodiments are not limited thereto.

Priority may be assigned to an SP when a review thereof input through a friend account includes a search word. Priority may be assigned to an SP when an introduction of the SP input by the SP itself includes a search word. Priority may be assigned to an SP when a higher grade is input with respect to the SP through a friend account. Priority may be assigned to an SP when the SP is designated as a bridge through a larger number of friend accounts. Priority may be assigned to an SP when the SP communicates more frequently with friend accounts. Priority may be assigned to an SP when a level of closeness or a similarity between a user who recommends the SP and a user account logging in to the user terminal 20 is higher. Priority may be assigned to an SP when a level of a user account through which the SP is recommended is higher. Priority may be assigned to an SP when the distance between a current position of a user and a current position of the SP is shorter. In the above examples, the friend accounts may be replaced with another user account.

A level of closeness between user accounts may be determined according to a set relationship between or a history of activities between the user accounts. The level of closeness may be differently set according to a category of a service. A level of a user account may be determined according to a user's history of activities. Information regarding the current positions of the user and the SP may be received from the user terminal 20 accessing the user account or the SP account, and stored in the DB 130.

A user may select an SP from a search result and transmit a service request message to the SP. The service request message may include the user's name, telephone number, and position, information regarding an acquaintance who introduced the SP to the user, etc. The user may input his or her identification (ID), etc. instead of his or her telephone number to protect his or her personal information. The SP may respond to the service request message. The SP may response to the service request message. The user and the SP may exchange messages to suggest their conditions and conduct a negotiation.

According to an exemplary embodiment, when the list-of-my SPs provider 124 receives a third request to provide a home screen from the user terminal 20, the list-of-my SPs provider 124 may provide the home screen to the user terminal 20. The third request may be received via the interface providing unit 110. The home screen may be provided via the interface providing unit 110. Here, the home screen may display information related to a user account to which the user terminal 20 logs in. For example, the home screen may display SPs designated as bridges of the user account. To this end, the list-of-my SPs provider 124 may provide a list of SP accounts designated as bridges of the user account, i.e., a list of bridge accounts (hereinafter referred to as 'list of my SPs'). In detail, the list-of-my SPs provider 124 may provide a list of my SPs by checking information regarding SPs designated as bridges through the user account and producing a list of checked SPs, based on information regarding the user account stored in the DB 130. The user may view the SPs designated as his or her bridges through the home screen displayed on one screen.

The list-of-my SPs provider 124 may provide a list of my SPs such that bridge accounts are enumerated according to predetermined conditions as criteria. The criteria may include, for example, a number of times of communicating with a user, grades evaluated by the user, a most recent time when the user is contacted, etc. For example, the list-of-my SPs provider 124 provide the list of my SPs by enumerating the bridge accounts such that a bridge account through which the user is communicated a large number of times or through which the user is communicated most recently is first exposed.

According to an exemplary embodiment, the candidate SP extractor 125 checks contact information stored in the user terminal 20, and extracts contact information, which is estimated to be that of an SP, as a candidate SP from the contact information. Here, an extraction algorithm is not limited, and a method of extracting a keyword, a method of extracting contact information that is the same as previously stored SP contact information, etc. may be used. For example, the candidate SP extractor 125 may extract, as a candidate SP, contact information including preset keywords from the contact information stored in the user terminal 20. The keywords may be preset keywords related to a service, for example, of a hospital, a bank, a private educational institute, a babysitter, a teacher, an author, an assistant, etc. The keywords may be continuously updated through machine learning.

The candidate SP extractor 125 may exclude a candidate SP corresponding to contact information registered as an SP account among extracted candidate SPs.

The candidate SP extractor 125 may produce a list of candidate SPs by enumerating extracted candidate SPs, and provide the list of candidate SPs to the user terminal 20. The user terminal 20 may select candidate SPs from the list of candidate SPs and request the selected candidate SPs to be registered as new SPs. The candidate SP extractor 125 may generate a list of candidate SPs according to a third request received from the user terminal 20. The list of candidate SPs generated by the candidate SP extractor 125 may be included in a home screen and be provided to the user terminal 20 through the home screen. That is, the home screen may display a list of my SPs as described above, and may further display a list of candidate SPs.

According to an exemplary embodiment, the SP registration unit 126 produces a new SP account and registers it with the DB 130. According to an exemplary embodiment, the SP registration unit 126 may directly receive a request from an SP and produce a new SP account according to the request. According to another exemplary embodiment, the SP registration unit 126 may receive a request from a user and produce a new SP account according to the request.

In order to produce a new SP account according to a request received from a general user other than an SP, the SP registration unit 126 may produce an SP account in a deactivated state and then finally activate the SP account after an approval for the SP account is received from the SP. The SP account that is in the deactivated state may be activated when the approval is received from the SP within a predetermined limited time but may be deleted when the approval is not received from the SP within the predetermined limited time. A user may select a candidate SP from a list of candidate SPs provided in a home screen, and request to produce a new SP account.

According to an exemplary embodiment, the request processor 127 may receive a fourth request to recommend an SP from a user, and store a request to recommend an SP with respect to friend accounts, based on the fourth request. The stored request may be transmitted to terminals that log in to the friend accounts. The request processor 127 may obtain information regarding recommended SPs from the terminals logging in to the friend accounts. The request processor 127 may transmit the obtained information regarding the recommended SPs to the user terminal 20. The fourth request may be received via the interface providing unit 110. The request may be transmitted via the interface providing unit 110. The information regarding the recommended SPs may be also obtained and transmitted via the interface providing unit 110.

According to an exemplary embodiment, a user may input a search word to directly search for a desired SP from SP accounts enrolling a service, and request a friend account to recommend an SP. The user may stand by until he or she obtains information regarding a recommended SP from the friend account according to the request.

According to an exemplary embodiment, the DB 130 stores information regarding accounts enrolled in a provided social network service. The DB 130 may include a user account DB 131 for storing information regarding user accounts, and an SP account DB 132 for storing information regarding SP accounts.

The elements of the service providing apparatus 100 of FIG. 2 will be further described with reference to FIGS. 4 to 9 below.

Figure 3:
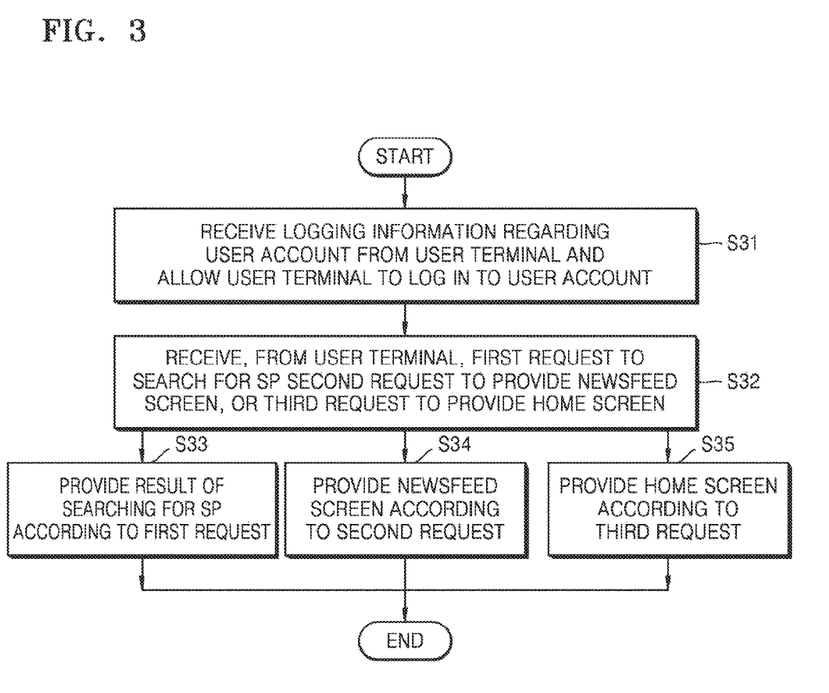
FIG. 3 is a flowchart of a method of providing a service according to an exemplary embodiment.

FIG. 3 is a flowchart of a method of providing a service according to an exemplary embodiment.

FIG. 3 is a flowchart of a method of providing a service, performed by the service providing apparatus 100 of FIG. 2. Thus, although not described here, the above description of the service providing apparatus 100 with reference to FIG. 2 also applies to the method of FIG. 3.

Referring to FIGS. 2 and 3, in operation S31, the account management unit 121 receives logging information regarding a user account from a user terminal 20, and allows the user terminal 20 to log in to the user account.

In operation S32, the interface providing unit 110 receives from the user terminal 20 a first request to search for an SP, a second request to provide a newsfeed screen, or a third request to provide a home screen. The interface providing unit 110 transmits the first, second, or third request to the information processing unit 120.

In operation S33, the search unit 123 receives the first request and provides a result of searching for an SP according to the first request.

In operation S34, the newsfeed provider 122 receives the second request and provides the newsfeed screen according to the second request.

In operation S35, the list-of-my SPs provider 124 receives the third request and provides the home screen according to the third request. The home screen may display a list of my SPs produced by the list-of-my SPs provider 124. In operation S35, the candidate SP extractor 125 may receive the third request, and produce a list of candidate SPs by enumerating candidate SPs extracted from contact information stored in the user terminal 20 according to the third request. The home screen may further display the list of candidate SPs. However, information displayed in the home screen is not limited thereto.

FIGS. 4 to 9 are diagrams illustrating examples of a screen provided on the user terminals 20 according to an exemplary embodiment.

Figure 4:
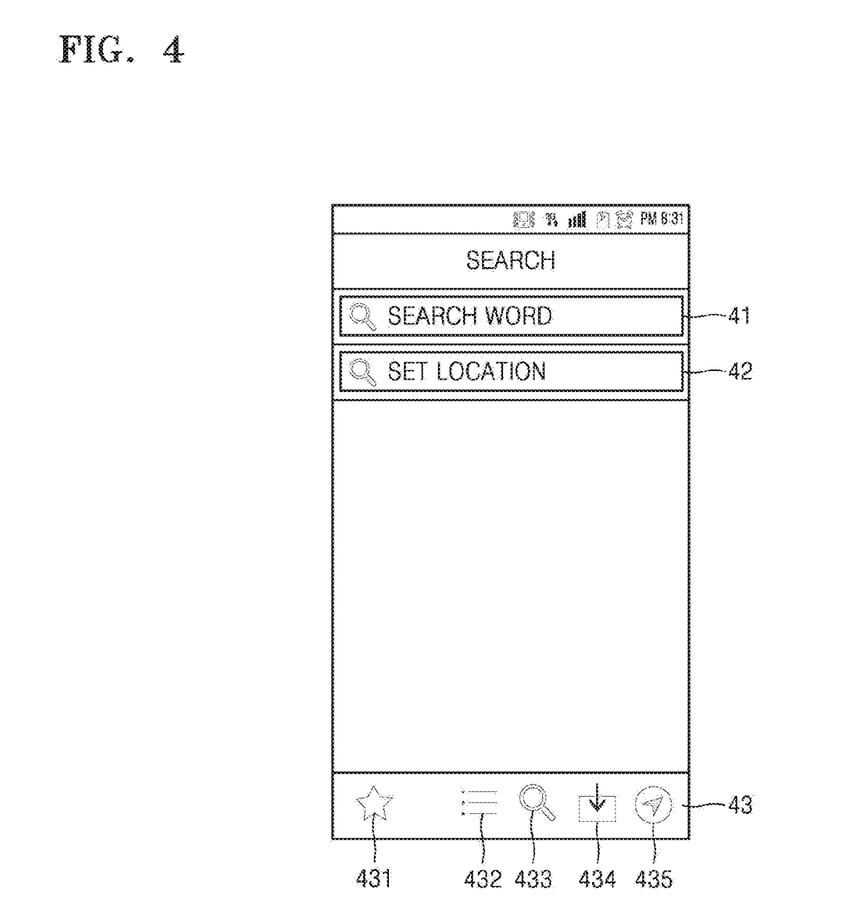
FIGS. 4 to 9 are diagrams illustrating examples of a screen according to an exemplary embodiment.

FIG. 4 illustrates a search screen provided according to an exemplary embodiment. The search screen includes a search window 41 in which a search word is input, and a location setting window 42 in which a location of an activity of an SP is set. At the bottom of the search screen, various icons 43 for moving to other screens are displayed. The icons 43 include a first icon 431 for moving to a home screen, a second icon 432 for moving to a newsfeed screen, a third icon 433 for moving to the search screen, a fourth icon 434 for storing a bridge, and a fifth icon 435 for storing a notice message, etc. However, exemplary embodiments are not limited thereto, and other icons not shown in FIG. 4 may be further displayed.

A user inputs a keyword into the search window 41 to search for a desired SP. The user may input location information into the location setting window 42 to define a location of the desired SP. Keyword information to be used to search for an SP may be stored in an SP account. For example, when an SP provides piano lessons, an SP account of the SP may include 'piano', 'piano lesson', 'classical piano', etc. as keyword information. The SP account may store information regarding a location of an activity for providing a service. The user may search for an SP by defining location information.

Figure 5:
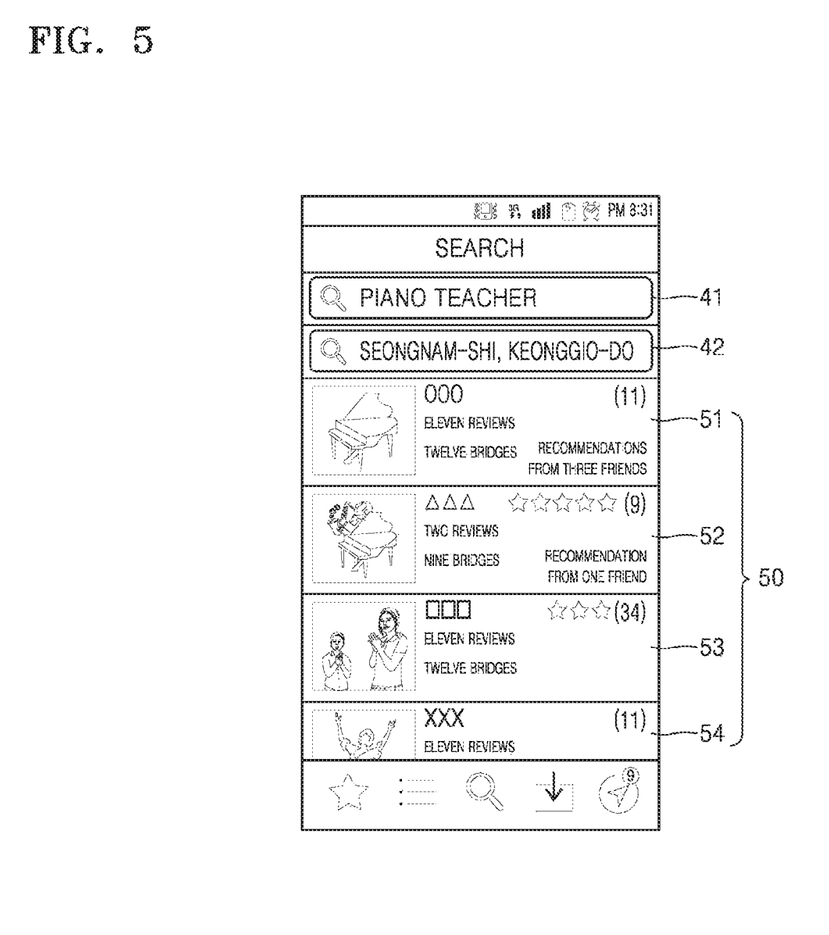

In a screen of FIG. 5, a user inputs 'piano teacher' as a search word into a search window 41 and inputs 'Seongnam-shi, Geonggi-do' into the location setting window 42. Thus, an SP matching the search word "piano teacher" may be searched for from among SPs that are capable of providing a service in "Seongnam-shi, Geonggi-do".

Various methods as described above may be used to match a search word and an SP to each other. For example, an SP account may include information regarding a category of a service. The search unit 123 of FIG. 2 may match a search word and an SP to each other, based on the information regarding the category of the service and the above keyword information, and may further take into a location of an activity to search for an SP matching a search condition. An example of a screen displaying a result of searching for an SP is illustrated in FIG. 5.

Referring to FIGS. 2 and 5, the search unit 123 may search for an SP, based on a search word input into the search window 41 and location information input into the location setting window 42, and provide a search result 50 of enumerating searched for SPs. In the search result 50, a first SP 51, a second SP 52, a third SP 53, and a fourth SP 54 are sequentially enumerated. The search unit 123 may enumerate the searched for SPs such that an SP recommended most frequently by friends or an SP designated as a bridge most frequently by friends is first enumerated. For example, the search unit 123 may first expose the first SP 51 recommended most frequently by friends and then expose the second SP 52 recommended secondly most frequently by friends. SPs recommended the same number of times by friends may be enumerated according to other conditions, e.g., an SP designated more frequently as a bridge by other users among the SPs may be first numerated.

Figure 6:
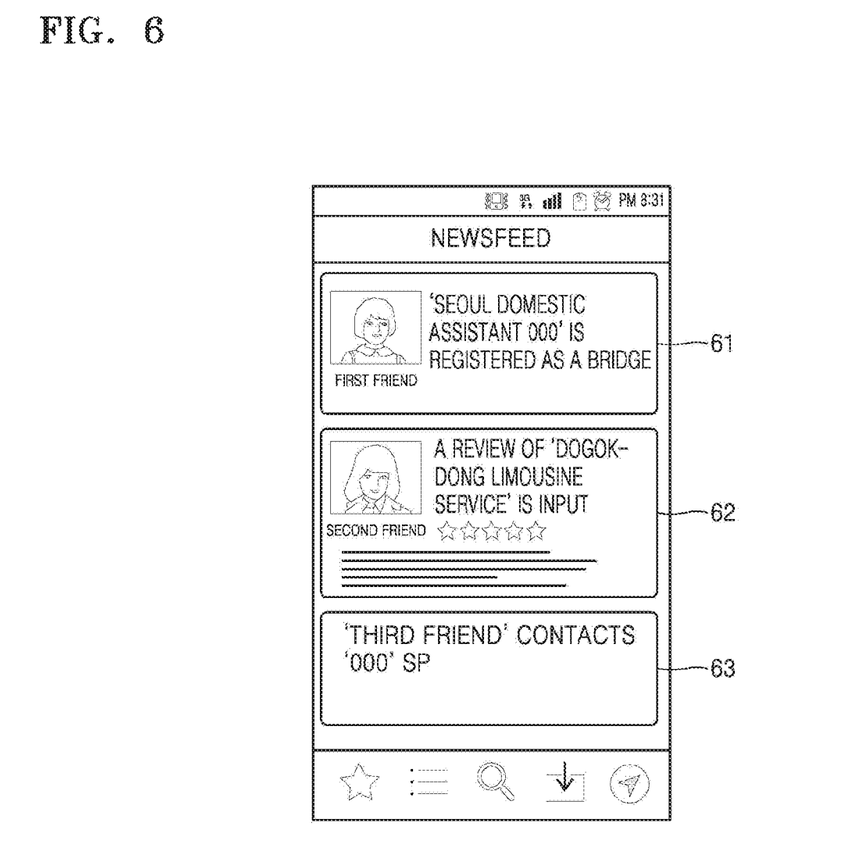

FIG. 6 illustrates an example of a newsfeed screen according to an exemplary embodiment. Referring to FIGS. 2 and 6, the newsfeed provider 122 may provide a newsfeed screen according to a request from a user. The newsfeed screen may enumerate a plurality of events. Referring to FIG. 6, in the newsfeed screen, a first event 61, a second event 62, and a third event 63 are displayed. The first event 61 and the second event 62 are examples of an event produced by a friend account. The third event 63 is an example of an event produced by a bridge account. In the newsfeed screen, events may be enumerated according to times when they were generated.

Figure 7:
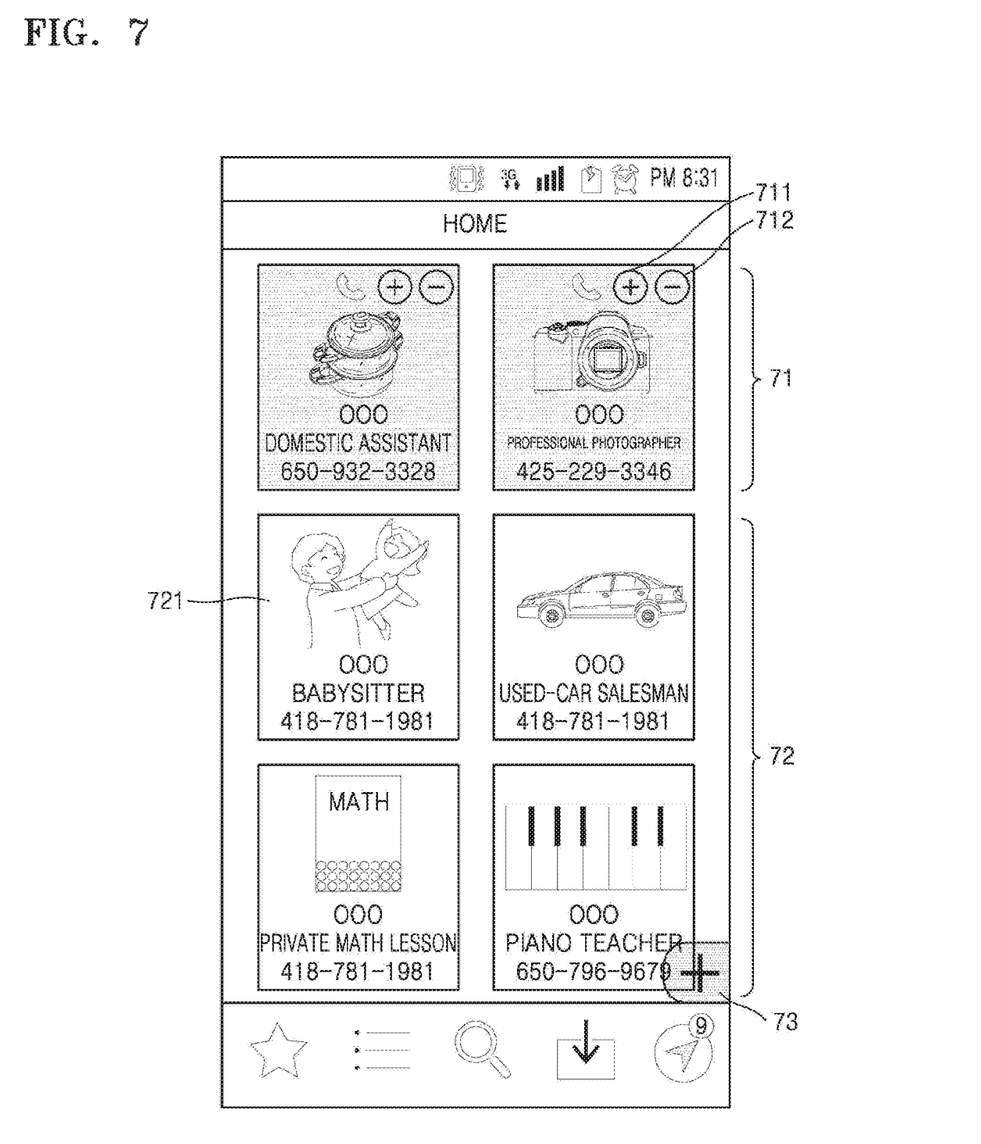

FIG. 7 illustrates an example of a home screen according to an exemplary embodiment. Referring to FIG. 7, the list-of-my SPs provider 124 of FIG. 2 may provide a home screen according to a user's request. In detail, the list-of-my SPs provider 124 may generate and provide a list of my SPs 72 included in the home screen. In the list of my SPs 72, bridge accounts may be enumerated. In this case, an order in which the bridge accounts are enumerated may be determined according to the number of times that each of the bridge accounts and a user account have communicated with each other, or the recent time when each of the bridge accounts and the user account have communicated with each other. For example, the list-of-my SPs provider 124 may first enumerate a bridge account that most recently communicated with the user account or the bridge account that have communicated most frequently with the user account.

Referring to FIGS. 2 and 7, the home screen may further include a list of candidate SPs 71. To this end, the candidate SP extractor 125 may check contact information stored in the user terminal 20, and generate and provide the list of candidate SPs 71 by extracting candidate SPs from the contact information.

A user may add a new SP account by selecting an icon 73. The user may register, as a new candidate SP, a candidate SP included in the list of candidate SPs 71 by selecting an icon 711. Otherwise, the user may delete a candidate SP not to be exposed in the list of candidate SPs 71 by selecting an icon 712.

Referring to FIG. 7, the list of candidate SPs 71 and a list of my SPs 72 may be differently displayed. For example, the list of candidate SPs 71 may be displayed to be emphasized more than the list of my SPs 72. Although FIG. 7 illustrates that the list of candidate SPs 71 is shaded to be emphasized more than the list of my SPs 72, but exemplary embodiments are not limited thereto.

Figure 8:
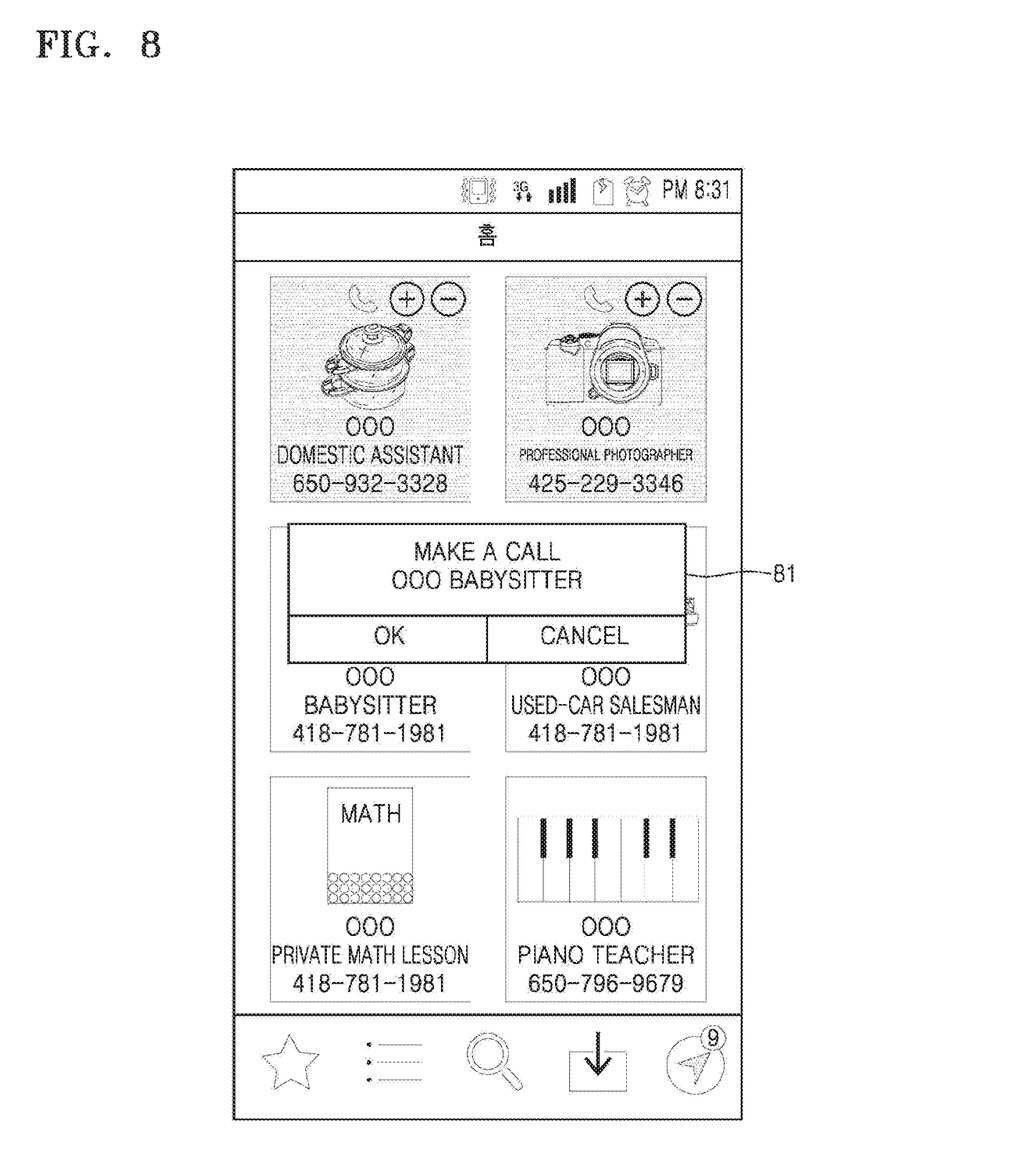

FIG. 8 illustrates a screen provided when an SP 721 is selected from the list of my SPs 72 of FIG. 7. Referring to FIGS. 2 and 8, when a user selects the SP 721, the interface providing unit 110 may provide a popup window 81 for directly making a call to a phone number of the selected SP 721. The user may press an 'OK' button to make a call to the phone number or press a 'CANCEL' button to exit the popup window 81.

Figure 9:
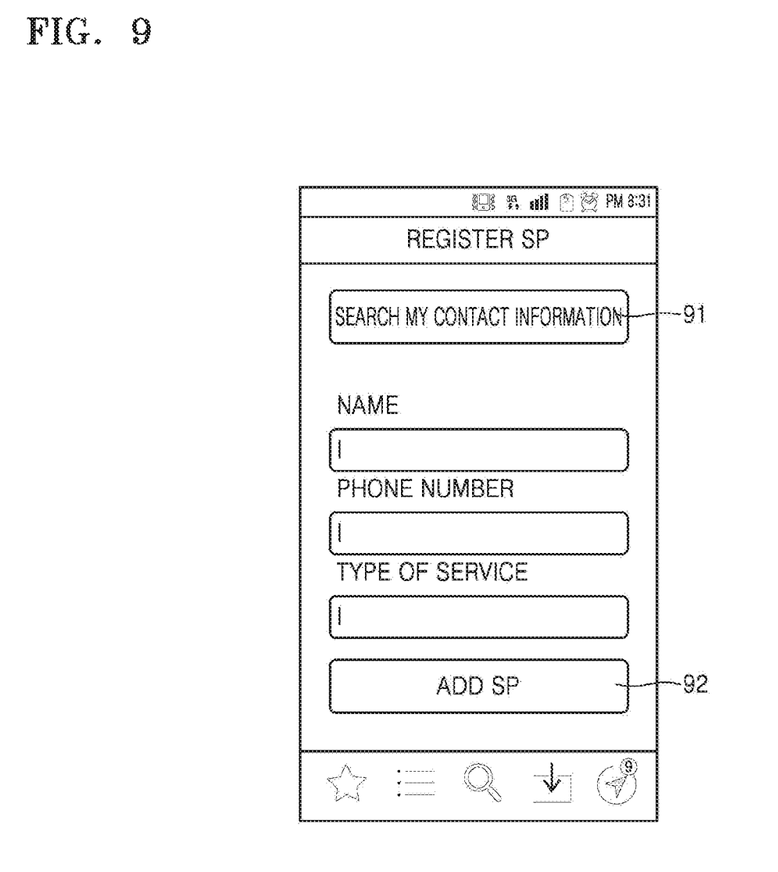

FIG. 9 illustrates a screen provided by the interface providing unit 110 of FIG. 2 when the icon 73 of FIG. 7 is selected. Referring to FIG. 9, a user may add an SP by directly inputting the name and contact information of the SP and a type of a service and pressing an 'ADD SP' icon 92. The user may select specific contact information from my contact information by selecting an icon 91. The name and phone number of the selected contact information and the type of the service may be automatically input into blanks of FIG. 9. The user may request to add an SP by selecting the 'ADD SP' icon 92. Here, the phone number is not limited to a phone number using a communication network and may be replaced with a mail address, an SNS account number, etc.

As described above, even if a general user requests to add an SP, the account management unit 121 of FIG. 2 may contact the SP to receive an approval for registration of an SP account and then finally register the SP account after the approval for the registration of the SP account is received from the SP.

Figure 10:
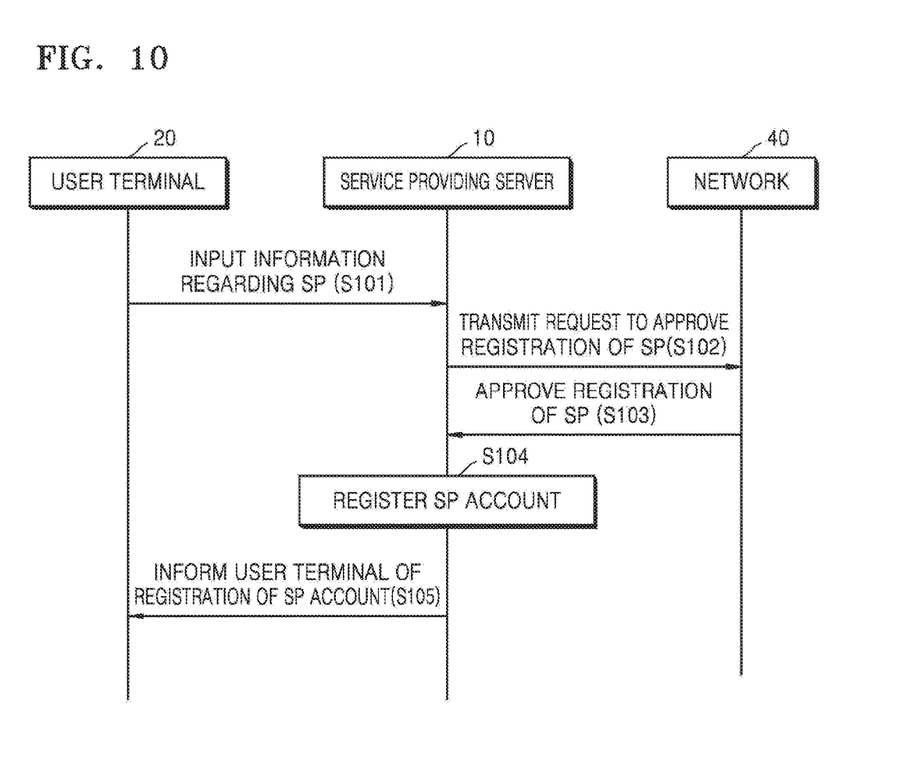
FIG. 10 is a flowchart of a process of registering a service provider (SP) account, performed by an account management unit of FIG. 2, according to an exemplary embodiment.

FIG. 10 is a flowchart of a process of registering an SP account, performed by the account management unit 121 of FIG. 2, according to an exemplary embodiment.

Both a user and an SP may access a service according to an exemplary embodiment by using a user terminal 20. However, for convenience of explanation, a terminal that a user uses will be referred to as the user terminal 20 and a terminal that an SP uses will be referred to as an SP terminal 40 when the flowchart of FIG. 10 will be described below.

Referring to FIG. 10, in operation S101, the user terminal 20 transmits information regarding an SP to a service providing server 10.

In operation S102, the service providing server 10 (particularly, the account management unit 121) transmits a request to approve registration of the SP to the SP terminal 40 using a phone number of the SP among the information regarding the SP received from the user terminal 20.

In operation S103, the SP terminal 40, which is a communication terminal using the phone number, transmits a reply to approve the registration to the service providing server 10, in response to the request.

In operation S104, the service providing server 10 (particularly, the account management unit 121) registers an SP account. In operation S105, the service providing server 10 (particularly, the account management unit 121) informs the user terminal 20 of the registration of the SP account corresponding to information input by a user.

As described above, a process of registering an SP account is designed to request a procedure of receiving an approval from an SP. Thus, information regarding the SP may be prevented from being revealed to users without the SP's approval therefor. Also, an SP account is prevented from being generated based on wrong information.

In the one or more of the above exemplary embodiments, even though a user account may be autonomously set up, an account of another service may be used. For example, a service according to an exemplary embodiment may be logged in to by using an account of another service.

According to various exemplary embodiments, a social network service providing method and apparatus are capable of enabling a user to share information regarding a service provider with other users and providing a result of searching for a service provider based on evaluations from other users registered as friends of the user. Accordingly, the user's convenience may be improved and a reliable search result may be provided, thereby satisfying the user's need.

According to one exemplary embodiment, users may easily and rapidly find a service provider and service providers may secure a channel for easily accessing users.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of providing a service, the method comprising:
    receiving by a service providing server, from a user terminal of a first user account, a first request to search for a service provider, a second request to display a newsfeed screen, or a third request to display a home screen; and
    providing, by a processor, a result corresponding to the received first, second, or third request,
    wherein when the first request is received, the providing of the result corresponding to the received first request comprises providing a list of service providers searched for according to the first request such that a service provider among the list of service providers that is recommended by a greater number of friends than other service providers among the list of service providers is set to have an exposure priority on the list that is higher than an exposure priority of other service providers among the list of service providers,
    wherein the friends correspond to other user accounts designated to have a first relation with the first user account,
    wherein when the second request is received, the providing of the result corresponding to the received second request comprises providing a newsfeed screen to the user terminal enumerating a plurality of events, including at least one among an event generated by a friend of the first user account and an event generated by a bridge of the first user account, wherein the plurality of events are enumerated in the newsfeed screen according to times when the plurality of events were generated,
    wherein when the third request is received, the providing of the result corresponding to the received third request comprises providing a home screen to the user terminal displaying a list of service providers related to the first user account, and
    wherein the home screen displays a list of service providers designated as bridges of the first user account, and a service provider who communicates more recently with the first user account or who communicates more frequently with the first user account is displayed earlier on the list.

2. The method of claim 1, wherein, in the providing of the result corresponding to the received first, second, or third request, when a plurality of the service providers are recommended by the same number of friends, a service provider who is reviewed more frequently or who is designated as a bridge by a greater number of the user accounts is set to have an exposure priority that is higher on the list than others of the plurality of service providers, wherein the bridge is a service provider designated to have a second relation with the user accounts.

3. The method of claim 1, wherein the event generated by the friend occurs when the friend designates a service provider as a bridge, cancels designating of a service provider as a bridge, prepares a review of a service provider, or recommends a service provider, and the event generated by the bridge occurs when information regarding the bridge changes.

4. The method of claim 1, wherein the providing of the result corresponding to the received first, second, or third request further comprises displaying a list of candidate service providers by extracting the candidate service providers from contact information stored in the user terminal.

5. The method of claim 4, wherein the candidate service providers are extracted from contact information including previously stored keywords, which is included in the contact information stored in the user terminal.

6. The method of claim 1, further comprising:
receiving a fourth request to recommend service providers from the user terminal of the first user account;
storing a request to recommend service providers with respect to a second user account designated to have the first relation with the first user account, according to the fourth request;
transmitting the request to a user terminal logging in to the second user account;
receiving information regarding recommended service providers from the user terminal logging in to the second user account; and
transmitting the information regarding the recommended service providers to the user terminal of the first user account.

7. The method of claim 1, further comprising:
receiving a request to register a service provider from the user terminal, wherein the request to register the service provider comprises contact information of the service provider;
transmitting a request to approve the registration of the service provider to the service provider, based on the contact information; and
registering the service provider's account when a reply to approve the registration of the service provider is received from the service provider in response to the request to approve the registration of the service provider.

8. An apparatus for providing a service, the apparatus comprising:
an interface providing unit of a service providing server configured to receive, from a user terminal of a first user account, a first request to search for a service provider, a second request to display a newsfeed screen, or a third request to display a home screen; and
an information processing unit of the service providing server configured to provide a result corresponding to the received first, second, or third request,
wherein the information processing unit comprises a search unit configured to search for a service provider and provide a list of service providers searched for according to the first request when the first request is received, and further comprises a newsfeed provider configured to provide the newsfeed screen to the user terminal,
wherein the search unit sets exposure priorities of the service providers on the list such that a service provider recommended by a greater number of friends than other service providers on the list of service providers has an exposure priority on the list that is higher than an exposure priority of other service providers among the list of service providers,
wherein the friends correspond to other user accounts designated to have a first relation with a first user account,
wherein when the second request is received, the providing of the result corresponding to the received second request comprises providing a newsfeed screen to the user terminal enumerating a plurality of events, including at least one among an event generated by a friend of the first user account and an event generated by a bridge of the first user account, wherein the plurality of events are enumerated in the newsfeed screen according to times when the plurality of events were generated,
wherein when the third request is received, the providing of the result corresponding to the received third request comprises providing a home screen to the user terminal displaying a list of service providers related to the first user account, and
wherein the home screen displays a list of service providers designated as bridges of the first user account, and a service provider who communicates more recently with the first user account or who communicates more frequently with the first user account is displayed earlier on the list.

9. A non-transitory computer-readable recording medium having recorded thereon a program which, when executed by a computer, performs the method comprising:
receiving by a service providing server, from a user terminal of a first user account, a first request to search for a service provider, a second request to display a newsfeed screen, or a third request to display a home screen; and
providing, by a processor of the service providing server, a result corresponding to the received first, second, or third request,
wherein when the first request is received, the providing of the result corresponding to the received first request comprises providing a list of service providers searched for according to the first request such that a service provider recommended by a greater number of friends than other service providers among the list of service providers is set to have an exposure priority on the list that is higher than an exposure priority of other service providers among the list of service providers,
wherein the friends correspond to other user accounts designated to have a first relation with the first user account,
wherein when the second request is received, the providing of the result corresponding to the received second request comprises providing a newsfeed screen to the user terminal enumerating a plurality of events, including at least one among an event generated by a friend of the first user account and an event generated by a bridge of the first user account, wherein the plurality of events are enumerated in the newsfeed screen according to times when the plurality of events were generated,
wherein when the third request is received, the providing of the result corresponding to the received third request comprises providing a home screen to the user terminal displaying a list of service providers related to the first user account, and wherein the home screen displays a list of service providers designated as bridges of the first user account, and a service provider who communicates more recently with the first user account or who communicates more frequently with the first user account is displayed earlier on the list.

\* \* \* \* \*